United States Patent
Okazaki

(10) Patent No.: US 11,982,071 B2
(45) Date of Patent: May 14, 2024

(54) DISPLAY SYSTEM OF TURNING WORK VEHICLE

(71) Applicant: YANMAR POWER TECHNOLOGY CO., LTD., Osaka (JP)

(72) Inventor: Kohei Okazaki, Fukuoka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 879 days.

(21) Appl. No.: 16/979,256

(22) PCT Filed: Jan. 24, 2019

(86) PCT No.: PCT/JP2019/002229
§ 371 (c)(1),
(2) Date: Sep. 9, 2020

(87) PCT Pub. No.: WO2019/181189
PCT Pub. Date: Sep. 26, 2019

(65) Prior Publication Data
US 2020/0399862 A1 Dec. 24, 2020

(30) Foreign Application Priority Data
Mar. 22, 2018 (JP) .................. 2018-054383

(51) Int. Cl.
*G05D 1/00* (2006.01)
*E02F 9/26* (2006.01)
*E02F 3/96* (2006.01)

(52) U.S. Cl.
CPC .......... *E02F 9/261* (2013.01); *G05D 1/0055* (2013.01); *E02F 3/964* (2013.01)

(58) Field of Classification Search
CPC . E02F 9/261; E02F 3/964; E02F 3/384; E02F 9/264; E02F 9/123; E02F 9/2033;
(Continued)

(56) References Cited

U.S. PATENT DOCUMENTS 5,835,874 A * 11/1998 Hirata .................. E02F 3/301
60/426
9,624,648 B2 4/2017 Arimatsu et al.
(Continued)

FOREIGN PATENT DOCUMENTS

JP 61-126225 A 6/1986
JP 7-94735 B2 10/1995
(Continued)

OTHER PUBLICATIONS

JP2004116108—Translated.pdf (Translation of JP-2004116108-A) (Year: 2023).*
(Continued)

*Primary Examiner* — Bao Long T Nguyen
(74) *Attorney, Agent, or Firm* — Future IP LLC; Tomoko Nakajima

(57) ABSTRACT

According to the present invention, a display system of a turning work vehicle is used for the turning work vehicle in which a work machine having a bucket 8 can be offset relative to a revolving superstructure in the horizontal direction. The display system includes: an arithmetic unit that calculates the position of the bucket on the basis of a detection result obtained by a position detecting device provided on the turning work vehicle, and calculates a necessary revolving amount of the revolving superstructure and a necessary offset amount of the work machine that are needed to align a side section of the bucket with a side edge of a predetermined excavation area; and a display device that displays the positional relationship between the bucket and the predetermined excavation area.

11 Claims, 10 Drawing Sheets

(58) Field of Classification Search
CPC . E02F 9/2037; E02F 3/43; E02F 9/265; E02F 9/262; E02F 9/26; E02F 9/24; G05D 1/0055
See application file for complete search history.

(56) References Cited

U.S. PATENT DOCUMENTS

| | | | |
|---|---|---|---|
| 2018/0313062 A1* | 11/2018 | Tsukamoto | ............... E02F 9/20 |
| 2020/0291606 A1* | 9/2020 | Izumikawa | ............... E02F 3/32 |

FOREIGN PATENT DOCUMENTS

| | | | | | |
|---|---|---|---|---|---|
| JP | 9-111811 A | | 4/1997 | | |
| JP | 2002-181539 A | | 6/2002 | | |
| JP | 2002-218538 A | | 6/2002 | | |
| JP | 2004-043168 A | | 2/2004 | | |
| JP | 2004-116108 A | | 4/2004 | | |
| JP | 2004116108 A | * | 4/2004 | ............... | E02F 3/435 |
| WO | WO2015/173936 A1 | | 11/2015 | | |
| WO | WO2017/115810 A1 | | 12/2016 | | |

OTHER PUBLICATIONS

International Search Report and Written Opinion for PCT Patent App. No. PCT/JP2019/002229 (dated Apr. 9, 2019).

\* cited by examiner

DISPLAY SYSTEM OF TURNING WORK VEHICLE

This application is a national phase entry under 35 U.S.C. § 371 of PCT Patent Application No. PCT/JP2019/002229, filed on Jan. 24, 2019, which claims priority under 35 U.S.C. § 119 to Japanese Patent Application No. 2018-054383, filed Mar. 22, 2018, both of which are incorporated by reference.

TECHNICAL FIELD

The present invention relates to a display system of a turning work vehicle, a turning work vehicle, and a display method for a turning work vehicle.

BACKGROUND ART

In a turning work vehicle such as a backhoe, by detecting a position of a construction work edge of a work machine, highly accurate control is possible. Being able to do so helps to achieve automation of the work and securing safety of the surroundings. Patent Literature 1 to 3 describes a hydraulic shovel as the turning work vehicle provided with means for detecting a position of the construction work edge of the work machine that has a bucket (that is, a blade edge of the bucket).

In addition, in a compact excavator, in particular, in order to enhance the workability in a narrow space, a function which enables the work machine to be offset relative to a revolving superstructure in a horizontal direction may be provided. In one aspect, the offset of the work machine is realized by swinging the work machine to right and left with respect to the revolving superstructure, and in another aspect, the offset is realized by translating the work machine to the right and left with respect to the revolving superstructure.

Patent Literature 1 describes a technique for detecting a position of a construction work edge, on the basis of outputs from a plurality of position sensors installed on a work machine, and positional information from two GPS antennas installed on a construction machine body. However, when this technique is applied to a turning work vehicle which is capable of offsetting a work machine in the horizontal direction as described above, since a relative relation between the output from the position sensor and the positional information from the antenna varies depending on the offset of the work machine, it is not possible to detect the position of the construction work edge.

Patent Literature 2 describes a technique for detecting a turning central position of an arm, on the basis of positional information from a GPS antenna installed on a construction work edge of the arm, and positional information from a GPS antenna installed on a construction machine body, and further detecting a position of the construction work edge on the basis of outputs from a plurality of position sensors. However, since the antenna needs to be installed at the construction work edge where great vibration and impact are to be applied during the work, the technique is not convenient in performing position detection of the construction work edge at high accuracy.

Patent Literature 3 describes a technique for displaying, on a screen, targeted turning information obtained for a blade edge of a bucket to face a targeted surface. However, when this technique is applied to a turning work vehicle which is capable of offsetting the work machine in the horizontal direction as described above, it is not possible to reflect the positional information of the bucket that has been changed by the offset. In addition, in construction such as digging of a side ditch, while a side section of the bucket needs to be aligned with a side edge of an excavation scheduled area, the technique in question does not consider the offset of the work machine, and the side section of the bucket. Thus, a high skill is required for an operator.

CITATION LIST

Patent Literature

Patent Literature 1: Japanese Unexamined Patent Application No. 2002-181538 A
Patent Literature 2: Japanese Unexamined Patent Application No. 2002-181539 A
Patent Literature 3: PCT International Publication No. WO 2015/173936

DISCLOSURE OF INVENTION

Problems to be Solved by the Invention

The present invention has been conceived in view of the above circumstances, and an object of the present invention is to provide a display system of a turning work vehicle, in which the turning work vehicle is capable of offsetting a work machine in a horizontal direction, and the display system is useful for operational assistance for construction such as digging of a side ditch, a turning work vehicle, and a display method for a turning work vehicle.

Means for Solving the Problems

A display system of a turning work vehicle according to the present invention is used for the turning work vehicle which can offset a work machine including a bucket relative to a revolving superstructure in a horizontal direction, in which the display system includes: an arithmetic unit, which calculates a position of the bucket on the basis of a result of detection by a position detecting device installed on the turning work vehicle, and calculates a necessary revolving amount of the revolving superstructure and a necessary offset amount of the work machine that are needed to align a side section of the bucket with a side edge of a predetermined excavation area; and a display device which displays a positional relationship between the bucket and the predetermined excavation area. Such a configuration contributes to, in the turning work vehicle capable of offsetting the work machine in the horizontal direction, operational assistance for construction such as digging of a side ditch.

The display device should preferably display information for informing about an operation amount of the revolving superstructure according to the necessary revolving amount, and an operation amount of the work machine according to the necessary offset amount. By this feature, it is possible to give operation guidance to the operator regarding revolution of the revolving superstructure and the offset of the work machine for aligning the side section of the bucket with the side edge of the predetermined excavation area.

It is preferable that a safety device, which restricts the revolution of the revolving superstructure and the offset of the work machine so that the bucket does not cross over the side edge of the predetermined excavation area, should be provided. By this feature, it is possible to prevent the bucket from colliding with a wall surface when wall-side excavation is to be performed.

The offset of the work machine may be performed by swinging the work machine to right and left with respect to the revolving superstructure.

The display device should preferably display at least the bucket and the predetermined excavation area in a plan view. By this feature, it is possible to accurately convey to the operator the positional relationship between the bucket and the predetermined excavation area, which is useful in aligning the side section of the bucket with the side edge of the predetermined excavation area.

The display device should preferably display the side edge of the predetermined excavation area by a virtual line extending in an extending direction of the predetermined excavation area. By displaying a position of the side edge of the predetermined excavation area, it is possible to effectively assist the operation of the operator.

A turning work vehicle according to the present invention includes: the display system of the turning work vehicle as described above; a lower traveling body; the revolving superstructure which is provided above the lower traveling body so as to be revolvable; and the work machine which can be offset relative to the revolving superstructure in the horizontal direction. As the above-described display system is provided, such a turning work vehicle contributes to operational assistance for construction such as digging of a side ditch.

A display method for a turning work vehicle according to the present invention is used for the turning work vehicle which can offset a work machine including a bucket relative to a revolving superstructure in a horizontal direction, in which the display method includes: calculating a position of the bucket on the basis of a result of detection by a position detecting device installed on the turning work vehicle, and calculating a necessary revolving amount of the revolving superstructure and a necessary offset amount of the work machine that are needed to align a side section of the bucket with a side edge of a predetermined excavation area; and displaying a positional relationship between the bucket and the predetermined excavation area on a screen of a display device. Such a method contributes to, in the turning work vehicle capable of offsetting the work machine in the horizontal direction, operational assistance for construction such as digging of a side ditch.

DESCRIPTION OF EMBODIMENTS

Hereinafter, an embodiment of the present invention will be described with reference to the accompanying drawings.

[Overview of Turning Work Vehicle]

Figure 1:
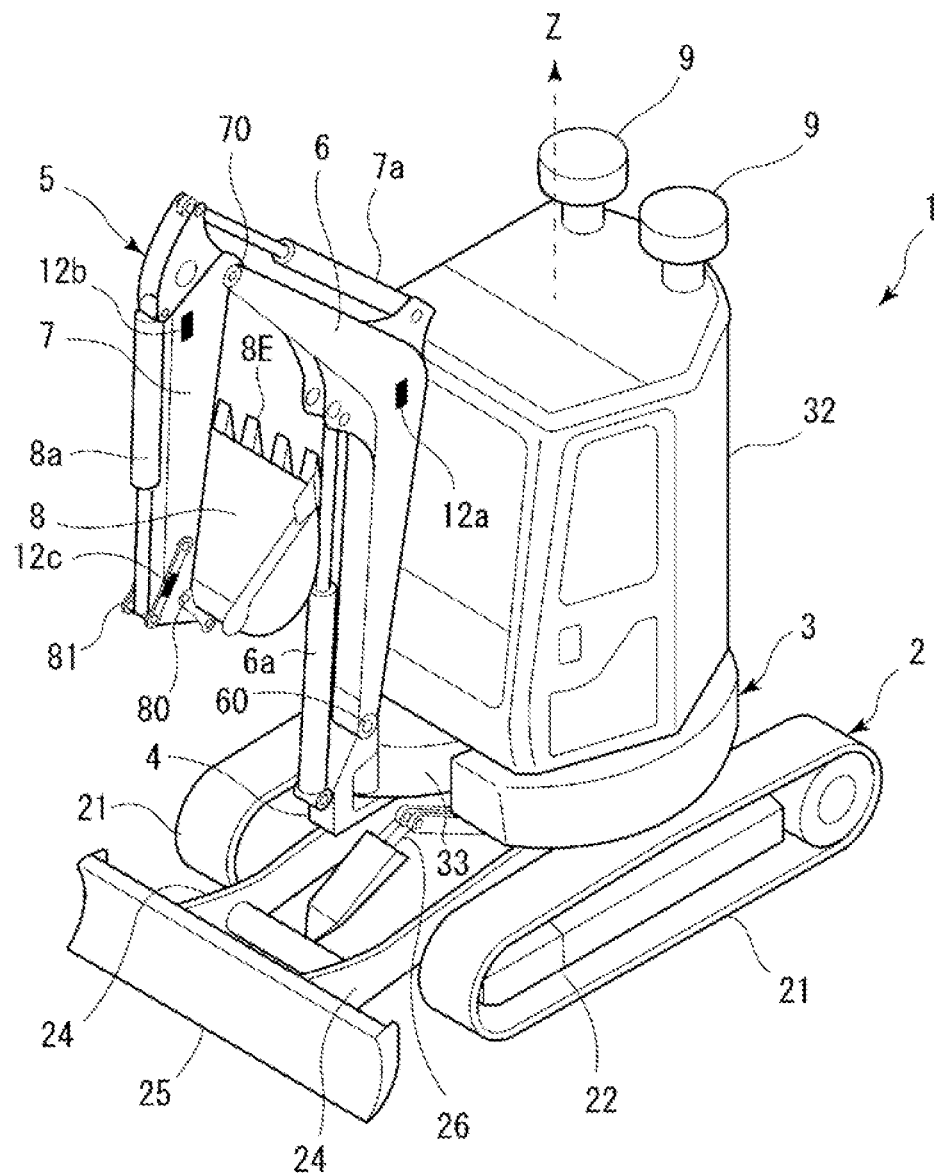
FIG. 1 is a perspective view showing an example of a turning work vehicle according to the present invention.
Figure 2:
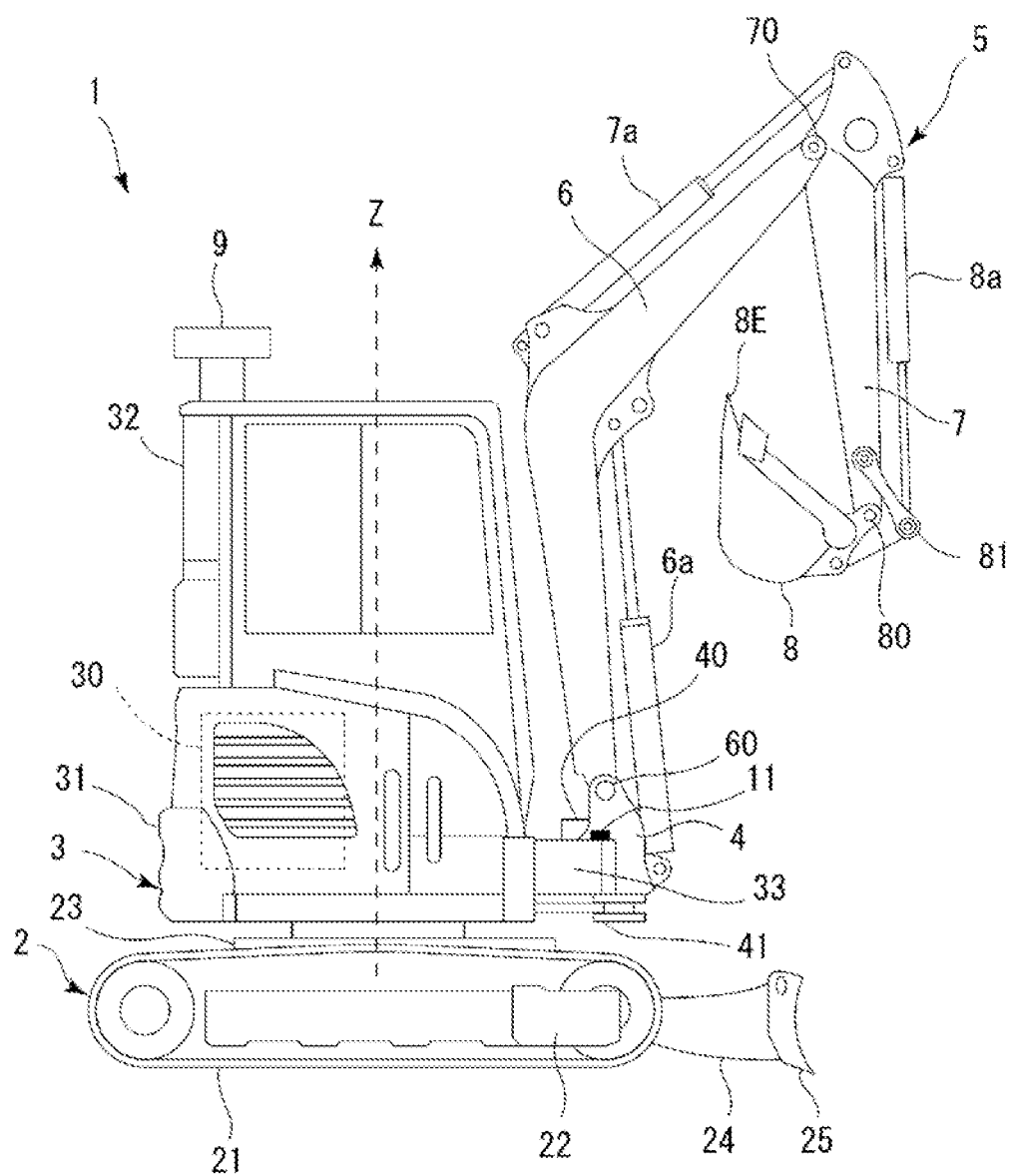
FIG. 2 is a right side view of the turning work vehicle of FIG. 1.

As shown in FIGS. 1 and 2, a turning work vehicle 1 is provided with: a lower traveling body 2; a revolving superstructure 3 which is provided above the lower traveling body 2 so as to be revolvable; and a work machine 5 which can be offset relative to the revolving superstructure 3 in a horizontal direction. In the present embodiment, the turning work vehicle 1 is configured as a shovel provided with a boom swing function (i.e., a backhoe), and the offset of the work machine 5 is performed by swinging the work machine 5 to right and left with respect to the revolving superstructure 3. In general, the boom swing function is provided in a compact excavator of which workability in a narrow space is required.

The lower traveling body 2 is driven as it receives power from an engine 30, and causes the turning work vehicle 1 to travel and turn. The lower traveling body 2 is provided with a pair of left and right crawlers 21 and 21, and a pair of left and right traveling motors 22 and 22 for driving the aforementioned crawlers 21 and 21. Between the pair of crawlers 21 and 21, a base 23 revolvably supporting the revolving superstructure 3 is provided. Also, the lower traveling body 2 is provided with: a pair of blade arms 24 and 24; a blade 25, which serves as an earth-moving plate, extending in a left-right direction between distal end portions of the blade arms 24 and 24; and a blade cylinder 26 for rotating the blade 25 up and down.

The revolving superstructure 3 is configured to be able to perform a revolving operation about an axis extending in a vertical direction at a central portion thereof. FIGS. 1 and 2 illustrate a Z-axis which corresponds with the aforementioned axis. The revolving superstructure 3 is formed in a substantially disk shape in a plan view to be revolvable within a breadth of the lower traveling body 2 (i.e., a distance between an outer edge of the left crawler 21 and an outer edge of the right crawler 21). The revolving superstructure 3 is equipped with the engine 30, a counterweight 31, a cabin 32, etc. A driving part surrounded by the cabin 32 is provided with, for example, a driver's seat (not shown) where an operator is seated, an operating device 33 (see FIG. 3) for the operator to perform an operation, and a display device 37 (see FIG. 3) which display various kinds of information.

The turning work vehicle 1 is provided with a boom bracket 4, which is a swing body supported on the revolving superstructure 3 so as to be horizontally rotatable. The boom bracket 4 is mounted on a front end portion of the revolving superstructure 3 via a stay 33. The stay 33 is provided with a pivot pin 40 in which an axis a (see FIG. 4) is oriented in the vertical direction. The boom bracket 4 is supported so as to be horizontally rotatable (that is, swingable right and left) about the pivot pin 40 of the boom bracket 4. The boom bracket 4 is rotated on a horizontal plane (for example, an X-Y plane shown in FIG. 5) orthogonal to the axis a. A swing cylinder 41, which expands and contracts in a front-rear direction, is provided between the revolving superstructure 3 and the boom bracket 4. The horizontal rotation of the boom bracket 4 is performed in accordance with the expansion and contraction of the swing cylinder 41.

The work machine 5 is driven as it receives power from the engine 30, and performs excavation work of the land, for example, in accordance with an operation performed in the driving part. The work machine 5 is supported on the boom bracket 4 so as to be vertically rotatable. The boom bracket 4 is provided with a pivot pin 60 in which an axis is oriented in the horizontal direction. A proximal end portion of the work machine 5 (i.e., a proximal end portion of a boom 6 which will be described later) is supported so as to be vertically rotatable about the above-mentioned pivot pin 60. The work machine 5 is rotated on a vertical plane (for example, an X-Z plane shown in FIG. 4) orthogonal to the axis of the pivot pin 60. The work machine 5 moves horizontally relative to the revolving superstructure 3 (i.e., is offset in the horizontal direction) by performing a swing operation in tandem with the horizontal rotation of the boom bracket 4.

The work machine 5 includes the boom 6, an arm 7, and a bucket 8, which is an attachment for excavation. The boom 6 is mounted on the boom bracket 4 so as to be vertically rotatable. The boom 6 extends in the vertical direction from the proximal end portion supported on the boom bracket 4, and is bent in the shape of a boomerang in a side view. A boom cylinder 6a, which is movable in an expandable and contractible manner, is provided between the boom bracket 4 and a middle portion of the boom 6. The vertical rotation of the boom 6 with respect to the boom bracket 4 is performed in accordance with the expansion and contraction of the boom cylinder 6a.

The arm 7 is attached to the boom 6 so as to be vertically rotatable. At a distal end portion of the boom 6, a pivot pin 70 in which an axis is oriented in the horizontal direction is provided. A proximal end portion of the arm 7 is supported so as to be vertically rotatable (i.e., rotatable to the front and rear) about the above-mentioned pivot pin 70. An arm cylinder 7a, which is movable in an expandable and contractible manner, is provided between the middle portion of the boom 6 and the proximal end portion of the arm 7. The vertical rotation of the arm 7 with respect to the boom 6 is performed in accordance with the expansion and contraction of the arm cylinder 7a.

The bucket 8 is attached to the arm 7 so as to be vertically rotatable. At a distal end portion of the arm 7, a pivot pin 80 in which an axis is oriented in the horizontal direction is provided. A proximal end portion of the bucket 8 is supported so as to be vertically rotatable (i.e., rotatable to the front and rear) about the above-mentioned pivot pin 80. A bucket link 81 is interposed between the distal end portion of the arm 7 and the bucket 8. The bucket link 81 is configured as a link which transmits a driving force to the bucket 8. A bucket cylinder 8a, which is movable in an expandable and contractible manner, is provided between the bucket link 81 and the proximal end portion of the arm 7. The vertical rotation of the bucket 8 with respect to the arm 7 is performed in accordance with the expansion and contraction of the bucket cylinder 8a. The bucket 8 includes a blade edge 8E, which serves as a construction work edge, and a side section 8S formed by a side panel.

[Control System of Turning Work Vehicle]

Figure 3:
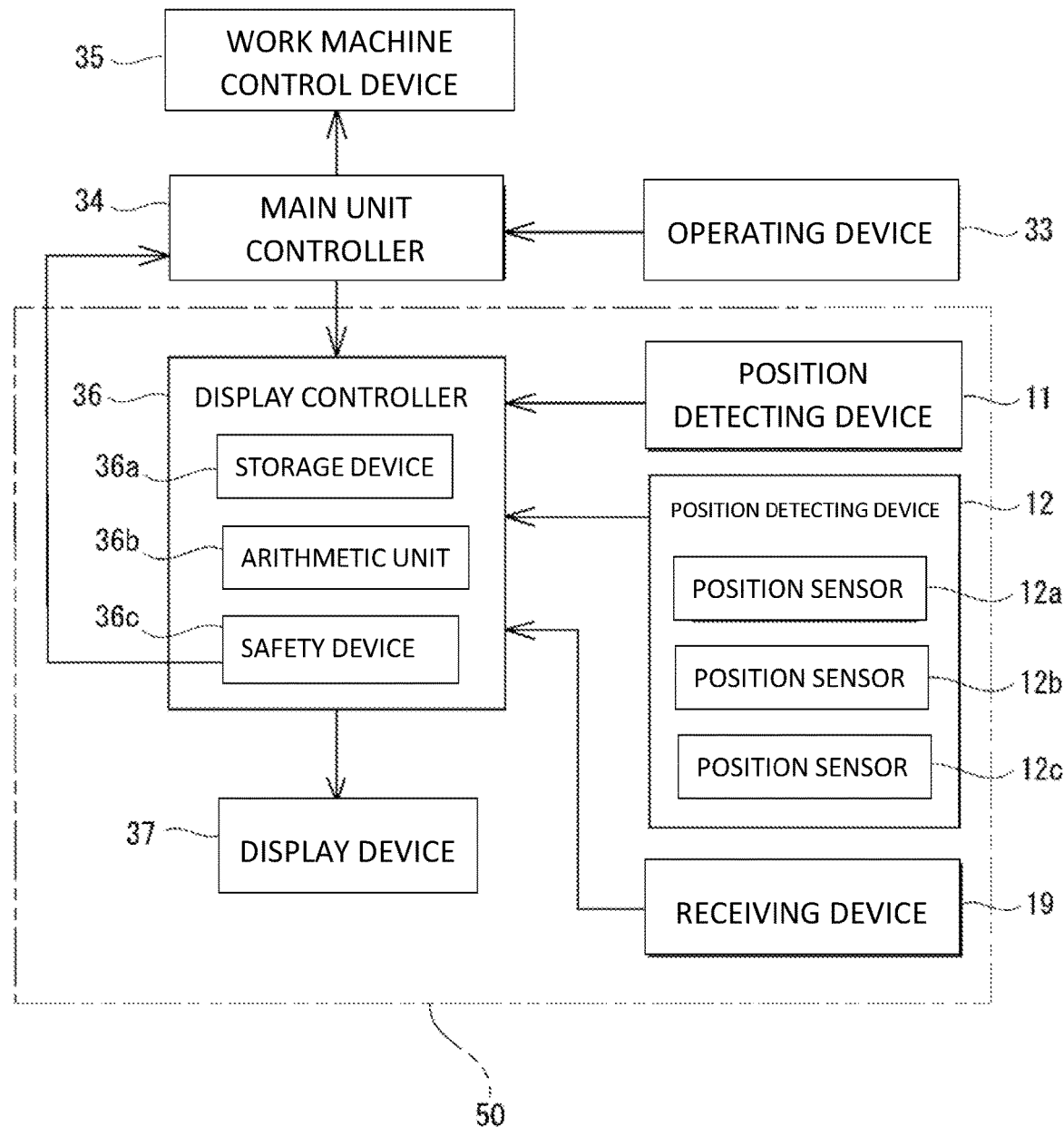
FIG. 3 is a block diagram showing a control system provided in the turning work vehicle.

An example of a control system provided in the turning work vehicle 1 will be briefly described. As shown in FIG. 3, the turning work vehicle 1 is provided with: the operating device 33; a main unit controller 34, which is a vehicle control device; a work machine control device 35; a display controller 36, which is a display control device; and a display device 37. The operating device 33 includes a lever, a switch, a pedal, an operation panel, etc. The operation panel may also serve as the display device 37. The main unit controller 34 controls a traveling operation of the lower traveling body 2 and a revolving operation of the revolving superstructure 3, on the basis of a control signal from the operating device 33. Also, the main unit controller 34 controls the work machine control device 35 and the display controller 36, on the basis of the control signal from the operating device 33.

The work machine control device 35 controls the operation of the work machine 5. The operation includes not only the vertical rotation of each of the boom 6, the arm 7, and the bucket 8, but also the swing operation (offset) of the work machine 5 caused by the horizontal rotation of the boom bracket 4. The display controller 36 is provided with a storage device 36a, an arithmetic unit 36b, and a safety device 36c. The storage device 36a is configured from random access memory (RAM) and read-only memory (ROM), etc., and stores various kinds of data which will be described later. The arithmetic unit 36b executes predetermined arithmetic processing, on the basis of the data stored in the storage device 36a, and a detection signal or the like from position detecting devices 11 and 12. The display controller 36 can display a result of the arithmetic processing, etc., on a screen of the display device 37.

A display system 50 is used for the turning work vehicle 1 capable of offsetting the work machine 5 having the bucket 8 relative to the revolving superstructure 1 in the horizontal direction, and provides the operator with information useful for operational assistance for construction in excavation work such as digging of a side ditch. The display system 50 is provided with the arithmetic unit 36b and the display device 37 as described above. The arithmetic unit 36b calculates the position of the bucket 8 on the basis of results of detection by the position detecting devices 11 and 12 installed on the turning work vehicle 1, and calculates a necessary revolving amount of the revolving superstructure 3 and a necessary offset amount of the work machine 5 that are needed to align the side section 8S of the bucket 8 with a side edge of a predetermined excavation area 90 (see FIG. 8). The display device 37 displays a positional relationship between the bucket 8 and the predetermined excavation area 90.

[Position Detection of Bucket]

Next, a method for detecting a position of the bucket 8 will be described. Strictly speaking, a position of the blade edge 8E of the bucket 8 is detected, and a position of the side section 8S is calculated on the basis of the blade edge position. As illustrated in FIG. 3, the turning work vehicle 1 is provided with the position detecting device 11 (a first position detecting device), and the position detecting device 12 (a second position detecting device). The position detecting device 11 detects a horizontal position of the boom bracket 4 with respect to the revolving superstructure 3. The position detecting device 12 detects a vertical position of the work machine 5 with respect to the revolving superstructure 3. The arithmetic unit 36b calculates the position of the blade edge 8E on the basis of the results of detection by the position detecting devices 11 and 12.

In the present embodiment, the position detecting device 11 is constituted by a position sensor installed on the boom bracket 4 as shown in FIG. 2. The position sensor detects movement of the boom bracket 4 on a plane where the boom bracket 4 is movable, or more specifically, the movement on a horizontal plane that is perpendicular to the axis a of the pivot pin 40. By installing such a position sensor on the boom bracket 4, it is possible to detect the horizontal position of the boom bracket 4 with respect to the revolving superstructure 3 comparatively easily. The present embodiment represents an example in which an acceleration sensor is used as the position sensor which constitutes the position detecting device 11 to detect a swing angle θ2 of the boom bracket 4 with respect to the revolving superstructure 3.

The position sensor which constitutes the position detecting device 11 can alternatively be installed on the swing cylinder 41. Also, as the position sensor, although an inertial sensor such as the acceleration sensor can be used as described above, the position sensor is not limited to this example. For example, a gyro sensor, an angle sensor (tilt sensor), or a cylinder sensor (stroke sensor) can be used instead. When a cylinder sensor is used, the swing angle θ2 can be detected on the basis of an expansion/contraction amount (stroke amount) of the swing cylinder 41, whereby the horizontal position of the boom bracket 4 with respect to the revolving superstructure 3 can be detected.

In the present embodiment, the position detecting device 12 includes a position sensor 12a installed on the boom 6, a position sensor 12b installed on the arm 7, and a position sensor 12c installed on the bucket link 81, as shown in FIG. 1. Each of the position sensors 12a to 12c detects movement of the work machine 5 on a plane where the work machine 5 is movable, or more specifically, the movement on a vertical plane including the axis a of the pivot pin 40. The present embodiment represents an example in which acceleration sensors are used as the position sensors 12a to 12c to detect angles α, β and γ, which will be described later. Likewise the position detecting device 11, the position sensors which constitute the position detecting device 12 are not limited to inertial sensors such as the acceleration sensors.

Figure 4:
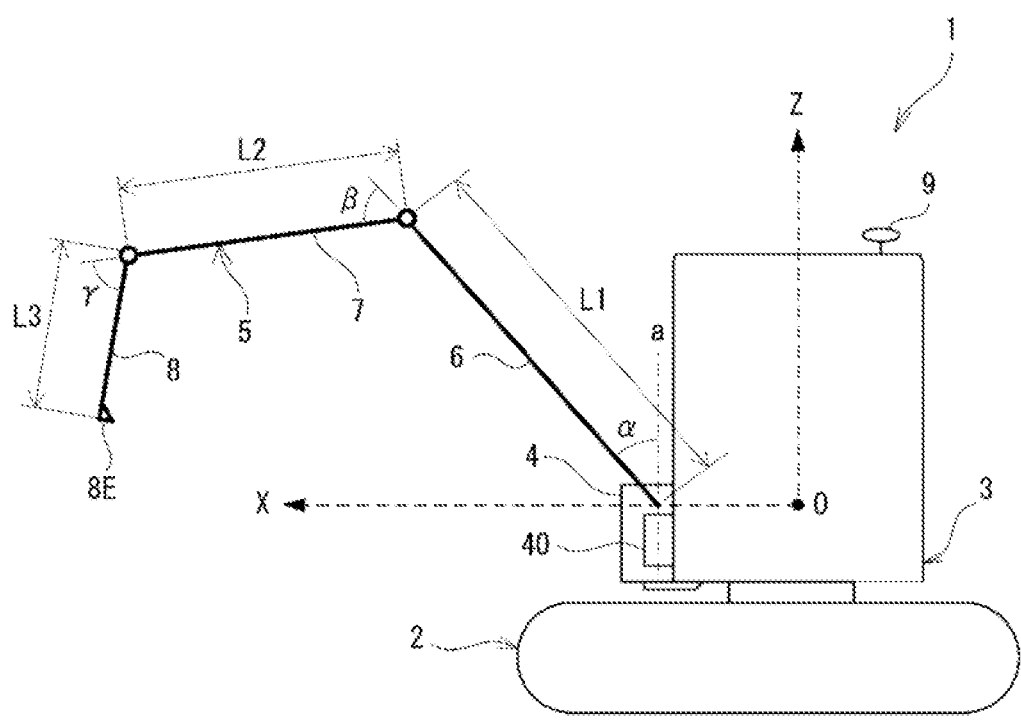
FIG. 4 is a left side view conceptually showing a coordinate system and the turning work vehicle.

FIG. 4 is a left side view conceptually showing a coordinate system and the turning work vehicle 1. The coordinate system is an orthogonal coordinate system defined by a horizontal X-axis extending from right to left in FIG. 4, a horizontal Y-axis (see FIG. 5) that is perpendicular to the plane of FIG. 4, and a vertical Z-axis extending upward and downward in FIG. 4. The X-axis extends in a front-rear direction of the lower traveling body 2, and the Y-axis extends in a left-right direction (width direction) of the lower traveling body 2. The Z-axis corresponds with an axis, which is the center of revolution, of the revolving superstructure 3. The X-Y plane including an origin O is located at the height of the axis of the pivot pin 60, and the axis a of the pivot pin 40 is orthogonal to the X-Y plane.

Figure 5:
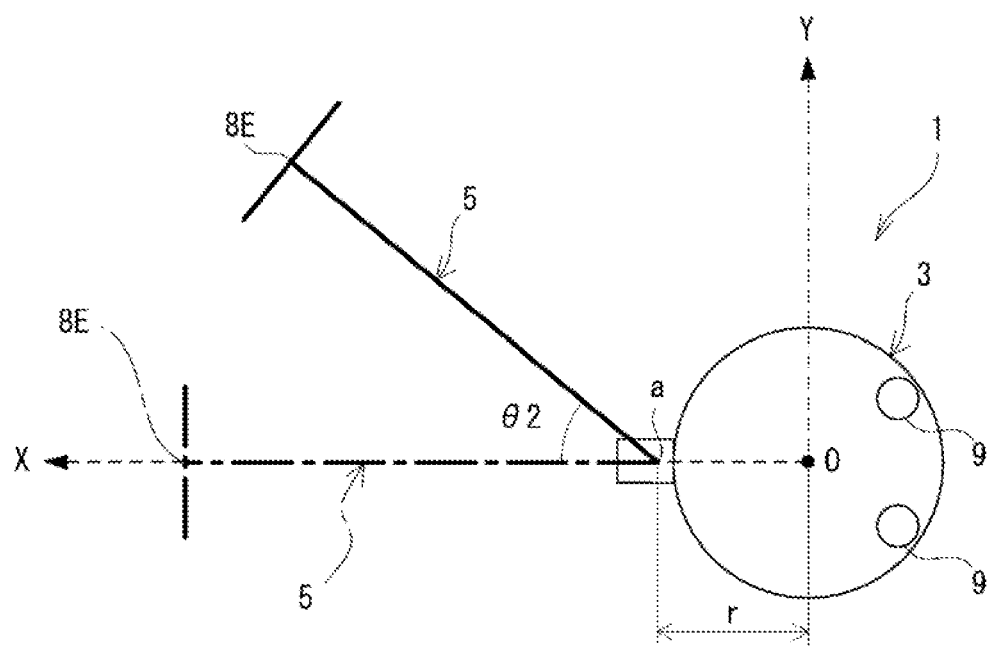
FIG. 5 is a plan view conceptually showing a coordinate system and the turning work vehicle.

FIG. 5 is a plan view conceptually showing a coordinate system and the turning work vehicle 1. The position of the work machine 5 illustrated in FIG. 4 is indicated by a chain line in FIG. 5. In FIGS. 4 and 5, the axis a of the pivot pin 40 is arranged on the X-axis. A revolving angle θ1 (see FIG. 6) of the revolving superstructure 3 with respect to the lower traveling body 2 is assumed with reference to the above-described state, and the revolving angle θ1 is zero in FIGS. 4 and 5. Further, in FIG. 4, the work machine 5 is arranged on the vertical plane (X-Z plane) including the axis a of the pivot pin 40 and the Z-axis. The swing angle θ2 of the boom bracket 4 with respect to the revolving superstructure 3 is assumed with reference to the above state, and the swing angle θ2 is zero in FIG. 4.

In FIG. 4, the work machine 5 is in state of being movable on the X-Z plane, in other words, each of the boom 6, the arm 7 and the bucket 8 is in a state of being vertically rotatable (i.e., rotatable to the front and rear) on the X-Z plane. The angle α is a tilt angle (rotation angle) of the boom 6 with reference to the axis a of the pivot pin 40. The angle β is a tilt angle (rotation angle) of the arm 7 with reference to an extending direction of the boom 6 (i.e., the direction of length L1). The angle γ is a tilt angle (rotation angle) of the bucket 8 with reference to an extending direction of the arm 7 (i.e., the direction of length L2). As described above, these angles α, β and γ can be detected by the position sensors 12a to 12c which constitute the position detecting device 12.

The length L1 is a length from the proximal end portion of the boom 6 to the distal end portion of the same, or more specifically, corresponds to a direct distance from the axis of the pivot pin 60 to the axis of the pivot pin 70. The length L2 is a length from the proximal end portion of the arm 7 to the distal end portion of the same, or more specifically, corresponds to a direct distance from the axis of the pivot pin 70 to the axis of the pivot pin 80. The length L3 is a length from the proximal end portion of the bucket 8 to a distal end portion of the same, or more specifically, corresponds to a direct distance from the axis of the pivot pin 80 to the blade edge 8E. Data regarding the lengths L1 to L3 is stored in the storage device 36a in advance.

The turning work vehicle 1 of the present embodiment includes two GPS antennas 9 and 9. Three-dimensional positional information of the antennas 9 and 9 is received by a receiving device 19 (see FIG. 3). The antennas 9 and 9 are fixed at predetermined positions on the turning work vehicle 1. In the present embodiment, the antennas 9 and 9 are arranged on a horizontal plane parallel to the X-Y plane. A relative position of the axis, which is the center of revolution, of the revolving superstructure 3 (more specifically, the Z-axis), and eventually, a relative position of the origin O (global coordinates) with respect to the antennas 9 and 9 are previously acquired on the basis of the specifications of the turning work vehicle 1, or by measurement carried out in advance. Further, such data is stored in the storage device 36a.

Figure 6:
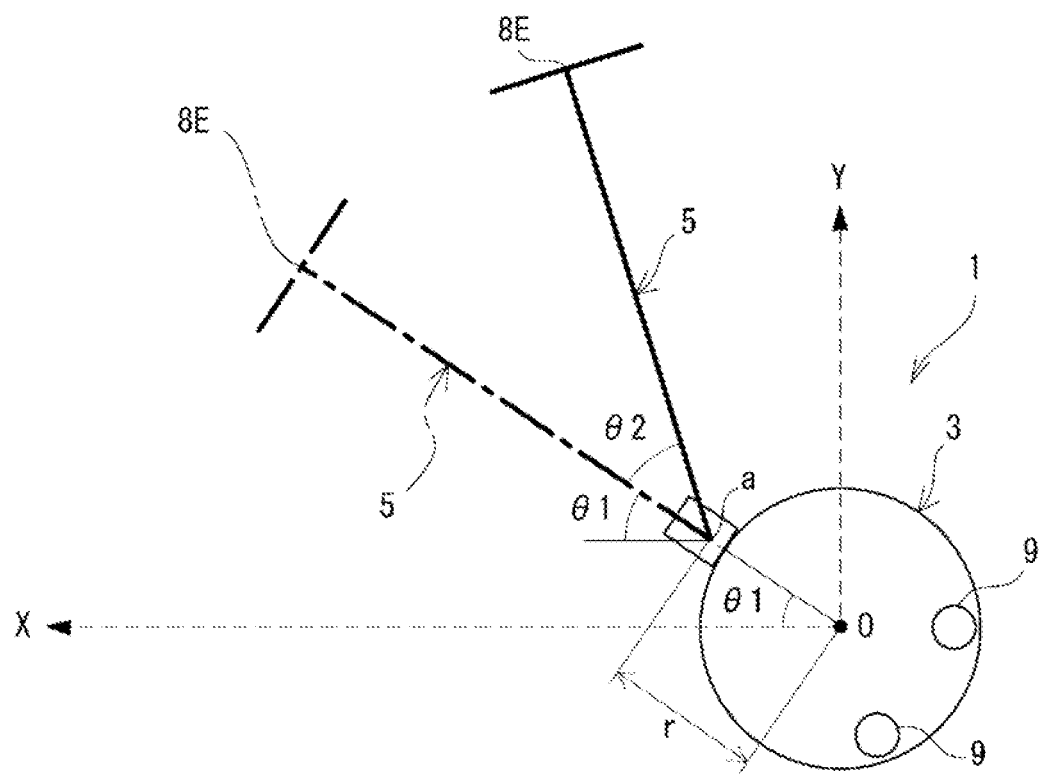
FIG. 6 is a plan view conceptually showing the coordinate system and the turning work vehicle.

FIG. 6 is a plan view conceptually showing the coordinate system and the turning work vehicle 1 as in FIG. 5. However, FIG. 6 is different from FIG. 5 in that the revolving superstructure 3 is revolved. In FIG. 6, the position of the work machine 5 when the swing angle θ2 is zero is shown by a chain line. Since a turning radius r of the axis a can be previously acquired, the acquired data is stored in the storage device 36a. The revolving angle θ1 of the revolving superstructure 3 with respect to the lower traveling body 2 can be calculated on the basis of the three-dimensional positional information of the antennas 9 and 9, and the data stored in the storage device 36a, and processing therefor is performed by the arithmetic unit 36b. As long as the information necessary for calculating the revolving angle θ1 can be obtained, the location for installing the antennas 9 and 9 on the turning work vehicle 1 is not particularly limited.

First, in a state where the revolving superstructure 3 is not revolved and the work machine 5 is not swung (that is, when θ1=0 and θ2=0), as shown in FIG. 4 and by the chain line in FIG. 5, given that the three-dimensional coordinates of the blade edge 8E where the position of the axis a on the X-Y plane is a base point are (Xa, Ya, Za), the coordinates (Xa, Ya, Za) can be obtained by the following formula:

$Xa = L1 \sin\alpha + L2 \sin(\alpha+\beta) + L3 \sin(\alpha+\beta+\gamma)$ $Ya = 0$ $Za = L1 \cos\alpha + L2 \cos(\alpha+\beta) + L3 \cos(\alpha+\beta+\gamma)$ Next, in a state where the work machine 5 is swung without revolving the revolving superstructure 3 (i.e., when θ1=0 and θ2≠0), as shown by a solid line in FIG. 5, given that the three-dimensional coordinates of the blade edge 8E where the position of the axis a on the X-Y plane is the base point are (Xa1, Ya1, Za1), the coordinates (Xa1, Ya1, Za1) can be obtained by the following formula:

$$Xa1 = Xa \cdot \cos\theta2$$
$$= \{L1\sin\alpha + L2\sin(\alpha+\beta) + L3\sin(\alpha+\beta+\gamma)\}\cos\theta2$$

$$Ya1 = Xa \cdot \sin\theta2$$
$$= \{L1\sin\alpha + L2\sin(\alpha+\beta) + L3\sin(\alpha+\beta+\gamma)\}\sin\theta2$$

$$Za1 = Za$$
$$= L1\cos\alpha + L2\cos(\alpha+\beta) + L3\cos(\alpha+\beta+\gamma)$$

Further, in the state where the revolving superstructure 3 is revolved ($\theta1 \neq 0$), as shown in FIG. 6, given that the three-dimensional coordinates of the axis a where the origin O on the X-Y plane is the starting point are (Xo0, Yo0, Zo0), and that the turning radius of the axis a is r, the coordinates (Xo0, Yo0, Zo0) can be obtained by the following formula:

$$Xo0 = r \cdot \cos\theta1$$

$$Yo0 = r \cdot \sin\theta1$$

$$Zo0 = 0$$

Furthermore, in a state where the revolving superstructure 3 is revolved, and the work machine 5 is not swung (i.e., when $\theta1 \neq 0$ and $\theta2 = 0$), as shown by the chain line in FIG. 6, given that the three-dimensional coordinates of the blade edge 8E where the origin O on the X-Y plane is the starting point are (Xo1, Yo1, Zo1), the coordinates (Xo1, Yo1, Zo1) can be obtained by the following formula:

$$Xo1 = Xa \cdot \cos\theta1 + Xo0$$
$$= \{L1\sin\alpha + L2\sin(\alpha+\beta) + L3\sin(\alpha+\beta+\gamma)\}\cos\theta1 + r\cdot\cos\theta1$$

$$Yo1 = Xa \cdot \sin\theta1 + Yo0$$
$$= \{L1\sin\alpha + L2\sin(\alpha+\beta) + L3\sin(\alpha+\beta+\gamma)\}\sin\theta1 + r\cdot\sin\theta1$$

$$Zo1 = Za + Zo0$$
$$= L1\cos\alpha + L2\cos(\alpha+\beta) + L3\cos(\alpha+\beta+\gamma)$$

Moreover, in a state where the revolving superstructure 3 is revolved, and the work machine 5 is swung (i.e., when $\theta1 \neq 0$ and $\theta2 \neq 0$), as shown by a solid line in FIG. 6, given that the three-dimensional coordinates of the blade edge 8E where the origin O on the X-Y plane is the starting point are (Xo2, Yo2, Zo2), the coordinates (Xo2, Yo2, Zo2) can be obtained by the following formula:

$$Xo2 = Xa \cdot \cos(\theta1 + \theta2) + Xo0$$
$$= \{L1\sin\alpha + L2\sin(\alpha+\beta) + L3\sin(\alpha+\beta+\gamma)\}\cos(\theta1+\theta2) + r\cdot\cos\theta1$$

$$Yo2 = Xa \cdot \sin(\theta1 + \theta2) + Yo0$$
$$= \{L1\sin\alpha + L2\sin(\alpha+\beta) + L3\sin(\alpha+\beta+\gamma)\}\sin(\theta1+\theta2) + r\cdot\sin\theta1$$

$$Zo2 = Za + Zo0$$
$$= L1\cos\alpha + L2\cos(\alpha+\beta) + L3\cos(\alpha+\beta+\gamma)$$

Therefore, given that the global coordinates of the origin O are (A, B, C), the global coordinates (Xg2, Yg2, Zg2) of the blade edge 8E can be obtained by converting the three-dimensional coordinates (Xo2, Yo2, Zo2) of the blade edge 8E by the following formula:

$$Xg2 = Xo2 + A$$
$$= \{L1\sin\alpha + L2\sin(\alpha+\beta) + L3\sin(\alpha+\beta+\gamma)\}\cos(\theta1+\theta2) + r\cdot\cos\theta1 + A$$

$$Yg2 = Yo2 + B$$
$$= \{L1\sin\alpha + L2\sin(\alpha+\beta) + L3\sin(\alpha+\beta+\gamma)\}\sin(\theta1+\theta2) + r\cdot\sin\theta1 + B$$

$$Zo2 = Zo2 + C$$
$$= L1\cos\alpha + L2\cos(\alpha+\beta) + L3\cos(\alpha+\beta+\gamma) + C$$

As described above, in the present embodiment, the horizontal position (and eventually, the swing angle $\theta2$) of the boom bracket 4 with respect to the revolving superstructure 3 is detected by the position detecting device 11, and the vertical position (and eventually, angles $\alpha$, $\beta$ and $\gamma$) of the work machine 5 with respect to the revolving superstructure 3 is detected by the position detecting device 12, thereby calculating the position of the blade edge 8E on the basis of those results of detection. Such arithmetic processing is executed by the arithmetic unit 36b while the data stored in the storage device 36a, and the information transmitted from the receiving device 19 are being referred to as appropriate. A result of the calculation can be notified to the operator by displaying the result on the display device 37, for example.

As described above, according to the present embodiment, in the turning work vehicle 1 having the boom swing function, the position of the blade edge 8E, which is the construction work edge of the work machine 5, can be detected with high accuracy. Further, based on the detected position of the blade edge 8E, and a mutual positional relationship between the blade edge 8E and the side section 8S, the position of the side section 8S can be calculated by the arithmetic unit 36b. The mutual positional relationship between the blade edge 8E and the side section 8S is previously acquired on the basis of the specifications of the work machine 5, or by measurement carried out in advance, and such data is stored in the storage device 36a.

[Operation Guidance Given During Construction]

Figure 7:
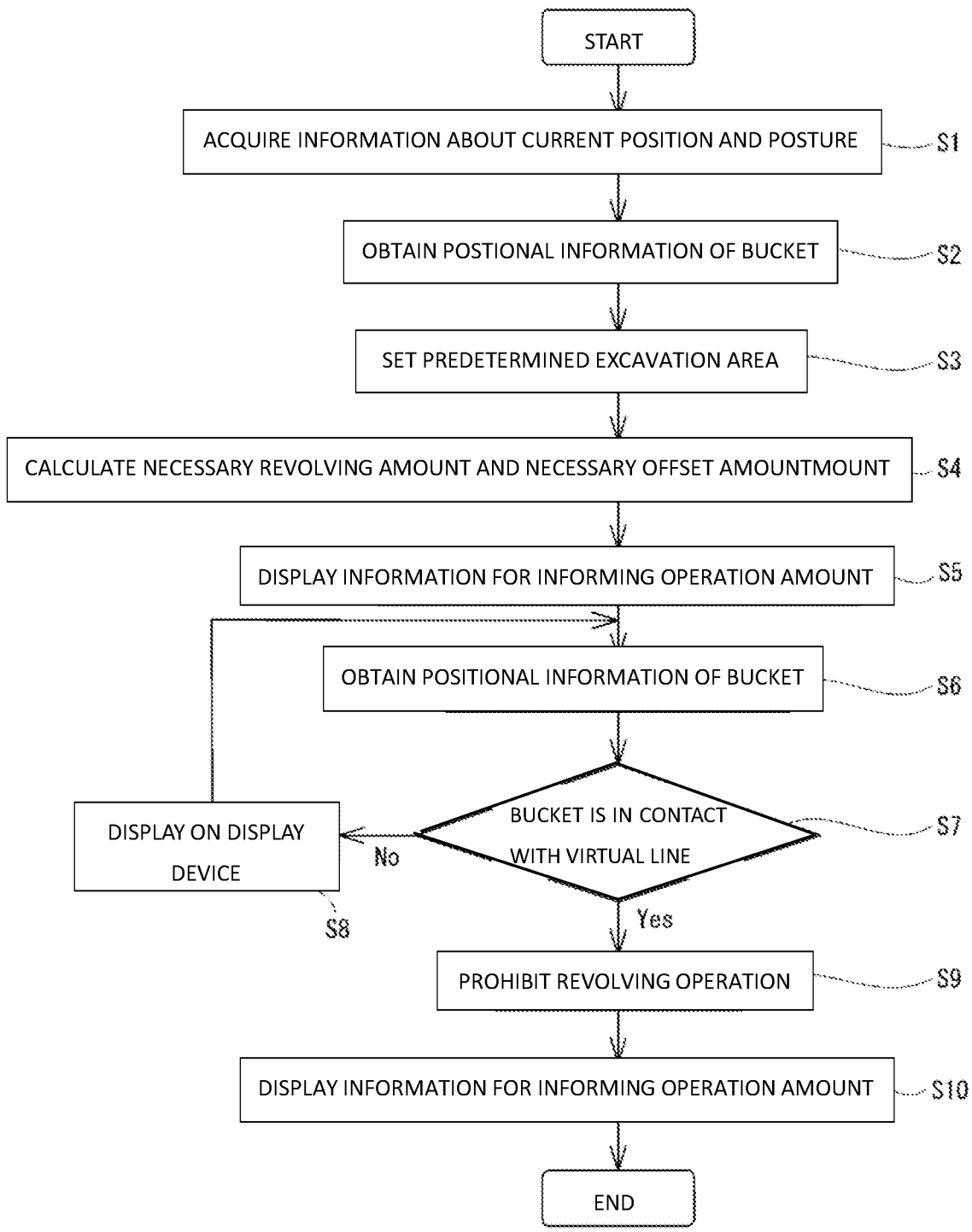
FIG. 7 is a flowchart showing an example of operation guidance given during construction.
Figure 8:
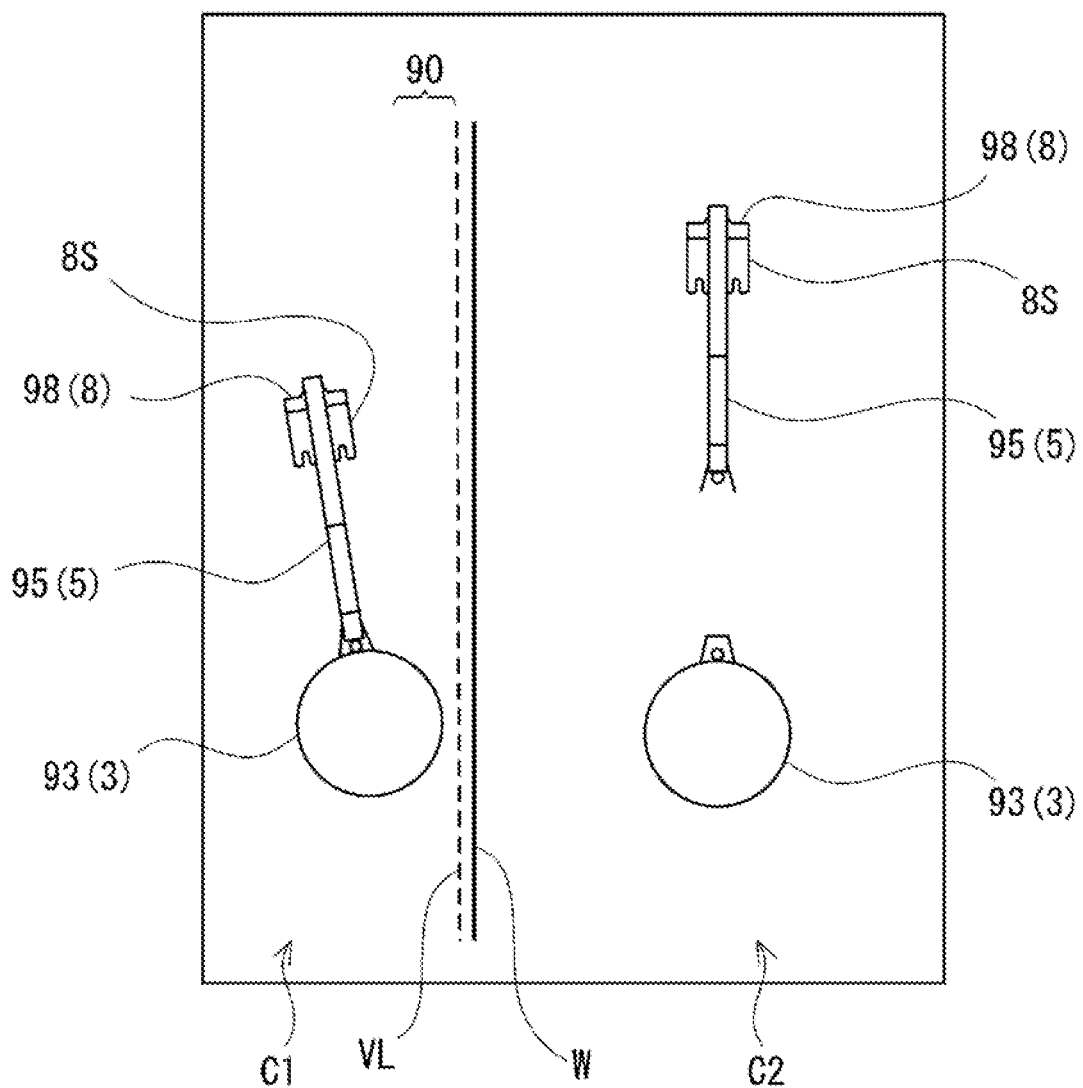
FIG. 8 is a diagram illustrating an example of a screen of a display device that is exhibited during construction of digging a side ditch.
Figure 9:
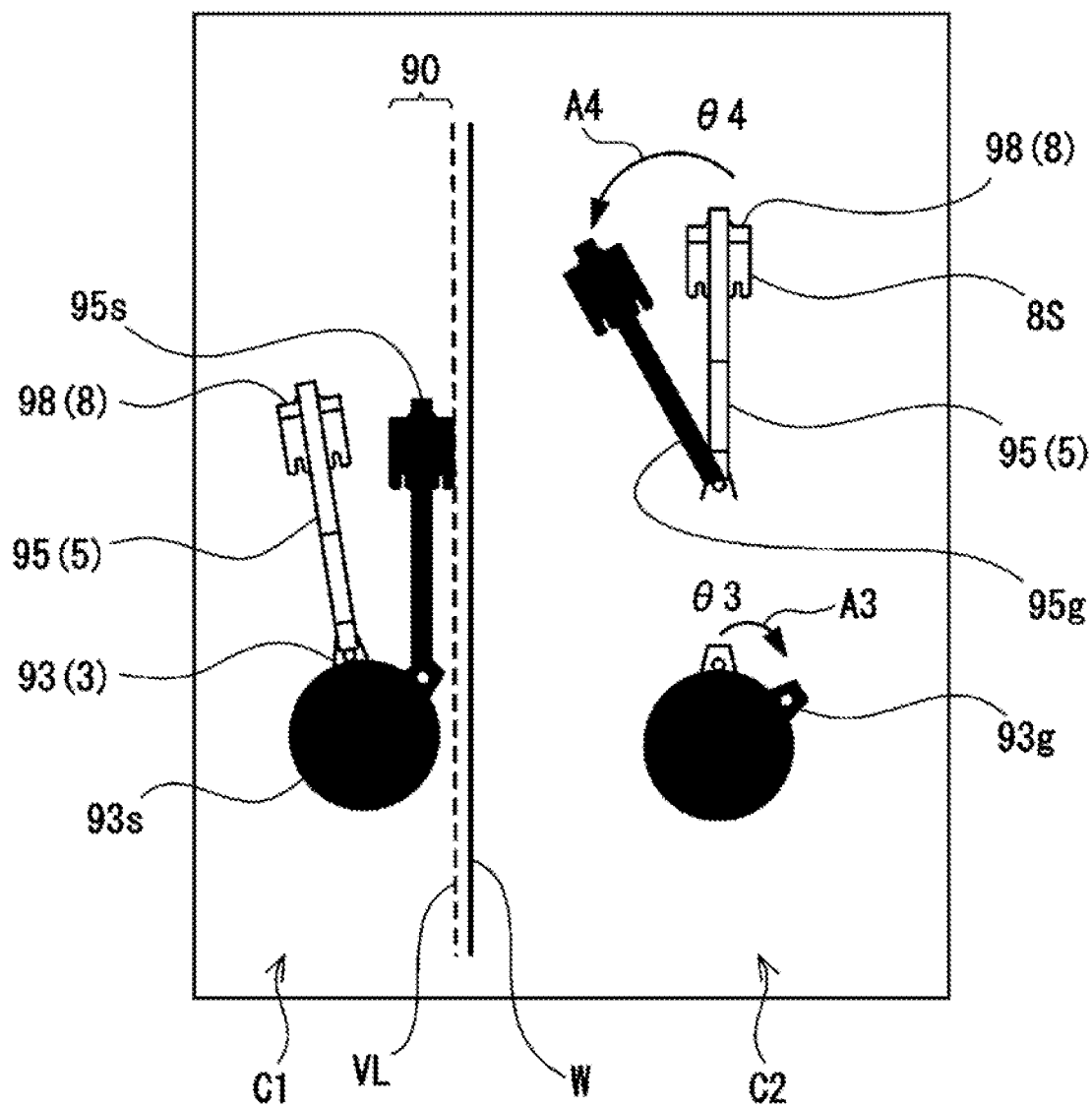
FIG. 9 is a diagram showing an example of a screen of the display device that is exhibited during the construction of digging a side ditch.
Figure 10:
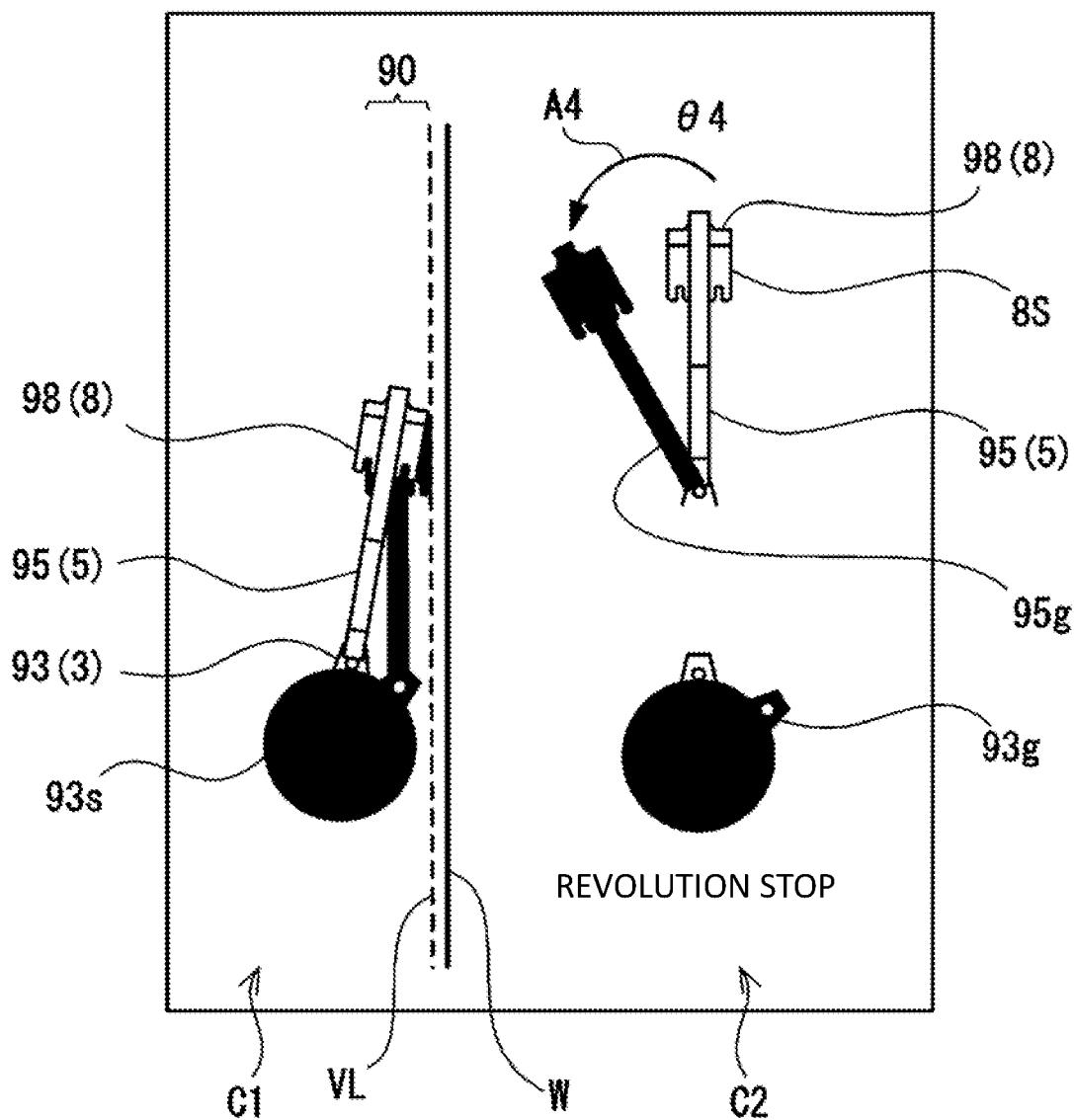
FIG. 10 is a diagram illustrating an example of a screen of the display device that is exhibited during the construction of digging a side ditch.

Next, operation guidance given during construction of digging of a side ditch will be described. FIG. 7 is a flowchart showing operation guidance given during the construction. FIGS. 8 to 10 each show a screen of the display device 37 that is exhibited during the construction. On the screen, the revolving superstructure 3, the work machine 5, and the bucket 8 are indicated by icons 93, 95, and 98, respectively. In the present embodiment, the left side of the screen is configured as a display field C1 showing the turning work vehicle in a plan view. The turning work vehicle is schematically represented by the revolving superstructure 3, and the work machine 5 including the bucket 8. The right side of the screen is configured as a display field C2 showing the revolving superstructure 3 and the work machine 5 that are separated from each other in a plan view.

First, information about the current position and a posture of the turning work vehicle 1 is acquired (step S1). The aforementioned information can be acquired from, for example, the three-dimensional positional information of the antenna 9 and 9, and a relative positional relationship between the antenna 9 and 9 and the axis, which is the center of revolution, of the revolving superstructure 3. Next, positional information of the bucket 8, or specifically, the positional information of the blade edge 8E of the bucket 8 is obtained (step S2). As described previously, the above information can be calculated by the arithmetic unit 36b, on the basis of the results of detection by the position detecting devices 11 and 12 installed on the turning work vehicle 1. Then, the predetermined excavation area 90 where a ditch is to be excavated is set (step S3). The above setting is performed on the screen using the operation panel of the operating device 33, for example.

FIG. 8 shows the state before guidance is displayed. In the display field C1, the current position and the posture of the turning work vehicle 1 obtained in step S1, and the position of the bucket 8 obtained in step S2 are reflected. When wall-side excavation is to be performed, a wall surface W as shown in FIG. 8 should preferably be displayed. Information regarding the position and shape of the wall surface W is acquired or generated in advance, and such data is stored in the storage device 36a. Alternatively, the wall surface W may be set on the screen using the operation panel. In the display field C2, the revolving superstructure 3 and the work machine 5 in the initial state in which the predetermined excavation area 90 is set are each displayed to be oriented upward on the screen.

In the display field C1, the predetermined excavation area 90 that has been set in step S3 is displayed. In the present embodiment, the side edge of the predetermined excavation area 90 is displayed by a virtual line VL extending in an extending direction (i.e., a vertical direction in FIG. 8) of the predetermined excavation area 90. The side edge refers to the one located on the outer side in a width direction of the turning work vehicle 1 of a pair of side edges defining the predetermined excavation area 90. By displaying the side edge of the predetermined excavation area 90 in this way, it is possible to effectively assist the operation of the operator. However, the element to be displayed is not limited to the above. That is, a center line of the predetermined excavation area 90 may be displayed, or the predetermined excavation area 90 may be displayed as a belt-like area having a predetermined width.

The display device 37 displays the positional relationship between the bucket 8 and the predetermined excavation area 90 as shown in FIG. 8, and the positional relationship can be observed by the icon 98 and the virtual line VL in the present embodiment. In order to excavate a ditch in the predetermined excavation area 90, having ensured a state (hereinafter referred to as a "set state") in which the side section 8S of the bucket 8 is aligned with the virtual line VL, which is the side edge of the predetermined excavation area 90, it is necessary to make the work machine 5 perform an excavation operation. In order to shift the state from the initial state of FIG. 8 to the set state, the posture of the turning work vehicle must be changed by making full use of the revolving operation of the revolving superstructure 3 and the swing operation of the work machine 5, and a high manipulation skill is required for the operator.

Therefore, in the display system 50, in order to serve for operational assistance for construction, the arithmetic unit 36b calculates the necessary revolving amount of the revolving superstructure 3 and the necessary offset amount of the work machine 5 that are needed to align the side section 8S of the bucket 8 with the side edge of the predetermined excavation area 90 (step S4). The necessary revolving amount can be rephrased as the revolving angle of the revolving superstructure 3 that is necessary to shift to the set state. Also, the necessary offset amount can be rephrased as the swing angle of the work machine 5 that is necessary to shift to the set state in the present embodiment. As described above, the arithmetic unit 36b obtains by computation the revolving angle of the revolving superstructure 3, and the swing angle of the work machine 5 that are suitable for digging a side ditch.

The display device 37 displays information for informing about an operation amount of the revolving superstructure 3 according to the necessary revolving amount, and an operation amount of the work machine 5 according to the necessary offset amount (step S5). FIG. 9 is an example of a guidance screen displaying such information. In the display field C1, icons 93s and 95s indicating the revolving superstructure 3 and the work machine 5 in the set state are displayed. In the display field C2, an icon 93g of the revolving superstructure 3 for informing about the revolution that is necessary to shift to the set state, and an icon 95g of the work machine 5 for the same purpose are displayed. In this example, the operator is informed that the revolving superstructure 3 must be revolved to the right, and the work machine 5 must be swung to the left.

In the icon 93g in the display field C2 shown in FIG. 9, a revolving angle θ3, which is the operation amount of the revolving superstructure 3 according to the necessary revolving amount that has been calculated, is reflected. Similarly, in the icon 95g, a swing angle θ4, which is the operation amount of the work machine 5 according to the necessary offset amount that has been calculated, is reflected. The operator can visually recognize how much the revolving superstructure 3 should be revolved to the right, in view of the positional relationship between the icon 93 and the icon 93g. Also, the operator can visually recognize how much the work machine 5 should be swung to the left, in view of the positional relationship between the icon 95 and the icon 95g. Numerical values of the revolving angle θ3 and the swing angle θ4, and the display of arrows A3 and A4 may be omitted as appropriate. In addition, visual effects may be enhanced by using light, or an acoustic effect may be added by using sound.

When the operator revolves the revolving superstructure 3 and/or swings the work machine 5, the positional information of (the blade edge 8E of) the bucket 8 according to such an operation is obtained (step S6), and whether the bucket 8 has come into contact with the virtual line VL is determined (step S7). If the bucket 8 is not in contact with the virtual line VL, the positions of the revolving superstructure 3 and the work machine 5 are displayed on the screen (in the display field C1) (step S8), and the positional information of the bucket 8 is continuously obtained. If the bucket 8 has come into contact with the virtual line VL, a further revolving operation of the revolving superstructure 3 is prohibited (step S9).

FIG. 10 shows an example of the screen when the bucket 8 has come into contact with the virtual line VL. If the revolving superstructure 3 is revolved to the right from this state, the bucket 8 will collide with the wall surface W. Thus, clockwise turning of the revolving superstructure 3 is restricted in order to prevent the collision. For the same reason, it is also possible to restrict rightward swing operation of the work machine 5. The display system 50 is provided with the safety device 36c (see FIG. 3), which restricts revolution of the revolving superstructure 3 and an offset (a swing in the present embodiment) of the work machine 5 so that the bucket 8 does not cross over the side edge of the predetermined excavation area 90. The safety device 36c sends a signal to the main unit controller 34 when the bucket 8 has come into contact with the virtual line VL, and executes restriction of the revolution and offset as described above. In addition to prohibition of the revolving operation, the screen may be blinked or a sound effect may be produced, for example, to notify the operator of the fact that the bucket 8 is in contact with the virtual line VL.

When the bucket 8 is in contact with the virtual line VL, the display device 37 displays that the revolution of the revolving superstructure 3 is restricted, and information for informing about the swing angle of the work machine 5 that is necessary to shift to the set state, as shown in FIG. 10 (step S10). By operating the revolving superstructure 3 and the work machine 5 in accordance with such instructions on the screen, it is possible to achieve the set state in which the side section 8S of the bucket 8 is aligned with the virtual line VL without making the bucket 8 collide with the wall surface W. As described above, the display system 50 provides the operator with information useful for construction of digging of a side ditch, such as in which direction and how much the revolving superstructure 3 should be revolved, and in which direction and how much the work machine 5 should be swung.

In the present embodiment, the display device 37 displays the revolving superstructure 3, and the work machine 5 extending from the front end portion of the revolving superstructure 3. However, the display is not limited to the above, and the other screen layout can alternatively be adopted. However, it is preferable that the display device 37 should display at least the bucket 8 and the predetermined excavation area 90 in a plan view. The plan view may be a view seen from above along the axial direction of central axis of revolution of the revolving superstructure 3. Also, the display of the predetermined excavation area 90 may be indicated by only the side edge.

In the present embodiment, an example in which the offset of the work machine is performed by swinging the work machine to right and left with respect to the revolving superstructure is described. However, the offset is not limited to the aforementioned example. That is, the offset may be performed by translating (the arm or the boom of) the work machine to the right and left with respect to the revolving superstructure. Such a turning work vehicle is disclosed in, for example, Japanese Unexamined Patent Application No. Hei 8-326086 A or Japanese Unexamined Patent Application No. 2011-184965 A, the applications of which were filed by the present applicant. In that case, the position of the bucket, and the necessary offset amount of the work machine may be calculated, on the basis of an actuation amount of an actuator (for example, the expansion/contraction amount of the cylinder) which translates the work machine to the right and left, instead of the swing angle of the work machine described above (i.e., the swing angle of the boom bracket).

In the present embodiment, an example of calculating a three-dimensional position of a blade edge of the bucket is described. However, the calculation is not limited to the above, and a two-dimensional position may be obtained by calculation. For example, the position of the blade edge of the bucket when the predetermined excavation area is set may be assumed as a work start point, and the necessary revolving amount and the necessary offset amount as described above may be calculated in consideration of the mutual positional relationship between the position of the blade edge and the predetermined excavation area. In that case, since the global coordinates do not need to be used, the GPS antennas can be omitted. In that event, a configuration may be made to detect a revolving angle of the revolving superstructure with respect to the lower traveling body by a position sensor (for example, an angle sensor) installed on the revolving superstructure.

The present invention is in no way limited to the embodiment described above, and various improvements and modifications can be made within the scope not departing from the spirit of the present invention.

DESCRIPTION OF REFERENCE NUMERALS

1 Turning work vehicle
2 Lower traveling body
3 Revolving superstructure
4 Boom bracket
5 Work machine
6 Boom
7 Arm
8 Bucket
8*a* Bucket cylinder
8E Blade edge
8S Side section
11 Position detecting device
12 Position detecting device
36 Display controller
36*a* Storage device
36*b* Arithmetic unit
36*c* Safety device
37 Display device
50 Display system
90 Predetermined excavation area

The invention claimed is:

1. A display system of a turning work vehicle, the display system being used for the turning work vehicle which can offset a work machine including a bucket relative to a revolving superstructure in a horizontal direction, the display system comprising:
    an arithmetic unit, which calculates a position of the bucket based on a result of detection by a position detecting device installed on the turning work vehicle, and calculates a necessary revolving amount of the revolving superstructure and a necessary offset amount of the work machine that are needed to align the bucket with a predetermined excavation area; and
    a display device which displays on a single screen
    information for informing about a revolving angle of the revolving superstructure according to the necessary revolving amount, and
    information for informing about a swing angle of the work machine according to the necessary offset amount,
    wherein a second display field shows a second position and posture of the turning work vehicle at a second state, and the second display field displays the revolving superstructure and the work machine detached from each other on the single screen.

2. The display system of the turning work vehicle according to claim 1, wherein the offset of the work machine is performed by swinging the work machine right and left with respect to the revolving superstructure.

3. A turning work vehicle comprising: the display system of the turning work vehicle according to claim 1; a lower traveling body; the revolving superstructure which is provided above the lower traveling body so as to be revolvable; and the work machine which can be offset relative to the revolving superstructure in a horizontal direction.

4. The display system of the turning work vehicle according to claim 1, wherein the display device displays a positional relationship between the bucket and qathe predetermined excavation area, and a side section of the bucket is aligned with a side edge of the predetermined excavation area.

5. The display system of the turning work vehicle according to claim 4, further comprising a safety device which restricts the revolution of the revolving superstructure and the offset of the work machine so that the bucket does not cross over the side edge of the predetermined excavation area.

6. The display system of the turning work vehicle according to claim 4, wherein the display device displays at least the bucket and the predetermined excavation area in a plan view.

7. The display system of the turning work vehicle according to claim 4, wherein the display device displays the side edge of the predetermined excavation area by a virtual line extending in an extending direction of the predetermined excavation area.

8. The display system of the turning work vehicle according to claim 1, wherein a first display field shows a first position and posture of the turning work vehicle at a first state.

9. The display system of the turning work vehicle according to claim 1, wherein the revolving superstructure and the work machine shown detached from each other on the single screen shows in a state.

10. The display system of the turning work vehicle according to claim 1, wherein the work machine swings on a axis located at a circumference of the revolving superstructure.

11. A display method for a turning work vehicle, the display method being used for the turning work vehicle which can offset a work machine, including a bucket, relative to a revolving superstructure in a horizontal direction, the display method comprising:
    calculating a position of the bucket based on a result of detection by a position detecting device installed on the turning work vehicle, and calculating a necessary revolving amount of the revolving superstructure and a necessary offset amount of the work machine that are needed to align the bucket with a predetermined excavation area;
    displaying on a single screen of a display device,
        information for informing about a revolving angle of the revolving superstructure according to the necessary revolving amount, and
        information for informing about a swing angle of the work machine according to
    the necessary offset amount,
    showing, in a second display field, a second position and posture of the turning work vehicle at a second state, and
    displaying, in the second display field, the revolving superstructure and the work machine detached from each other on the single screen.

* * * * *